United States Patent [19]
Noll et al.

[11] Patent Number: 5,732,138
[45] Date of Patent: Mar. 24, 1998

[54] METHOD FOR SEEDING A PSEUDO-RANDOM NUMBER GENERATOR WITH A CRYPTOGRAPHIC HASH OF A DIGITIZATION OF A CHAOTIC SYSTEM

[75] Inventors: Landon Curt Noll; Robert G. Mende, both of Sunnyvale; Sanjeev Sisodiya, Mountain View, all of Calif.

[73] Assignee: Silicon Graphics, Inc., Mountain View, Calif.

[21] Appl. No.: 592,891

[22] Filed: Jan. 29, 1996

[51] Int. Cl.$^6$ .......................................................... H04L 9/22
[52] U.S. Cl. ................... 380/28; 380/46; 364/717
[58] Field of Search ................... 380/14, 28, 46; 395/421.06; 364/717

[56] References Cited

U.S. PATENT DOCUMENTS

| | | | |
|---|---|---|---|
| 4,777,648 | 10/1988 | Gardiner | 380/14 |
| 4,780,816 | 10/1988 | O'Connell | 395/421.06 |
| 4,951,314 | 8/1990 | Shreve | 380/14 |
| 4,964,162 | 10/1990 | McAdam et al. | 380/14 |
| 5,048,086 | 9/1991 | Bianco et al. | 380/28 |

*Primary Examiner*—Salvatore Cangialosi
*Attorney, Agent, or Firm*—Wagner, Murabito & Hao

[57] ABSTRACT

A method for generating a pseudo-random numbers Initially, the state of a chaotic system is digitized to form a binary string. This binary string is then hashed to produce a second binary string. It is this second binary string which is used to seed a pseudo-random number generator. The output from the pseudo-random number generator may be used in forming a password or cryptographic key for use in a security system.

18 Claims, 7 Drawing Sheets

LAVA LAMP
AFTER t
SECONDS

METHOD FOR SEEDING A PSEUDO-RANDOM NUMBER GENERATOR WITH A CRYPTOGRAPHIC HASH OF A DIGITIZATION OF A CHAOTIC SYSTEM

FIELD OF THE INVENTION

The present invention relates to the field of pseudo-random number generation and computer security. More specifically, the present invention pertains to an apparatus and method for producing a seed for a pseudo-random number generator from hashing the digitization of a chaotic source. The present invention is preferably for use in cryptographic protocols that require random numbers.

BACKGROUND OF THE INVENTION

Computer applications may require random numbers in many contexts. Random numbers can be used to simulate natural or artificial phenomena in computer simulations; many algorithms that require randomness have been developed that outperform deterministic algorithms for the same problem; and random numbers can be used to generate or verify passwords for cryptography-based computer security systems. The present invention relates to the use of random numbers in such security systems, hereinafter referred to as "cryptographic applications." Specifically, the present invention pertains to generating a random number in a secure manner for such cryptographic applications.

In the context of cryptographic applications, there may be an hostile trespasser or agent, who desires to infiltrate the security of cryptographic security system in order to gain access to sensitive, confidential, or valuable information contained therein. For example, banks often encrypt their transactions and accounts. One common method for circumventing a cryptographic application is to guess at potential passwords or cryptographic key, which are then submitted on a trial basis. This process is repeated until, by happenstance, the valid password is chanced upon. Fortunately, this process is extremely time consuming and inefficient. Also, preventative action can be taken to render this type of attack highly ineffective. However, if the random number generator used in generating valid passwords is somehow flawed in any way, the hostile agent can potentially take advantage of this flaw to circumvent the security of the system. For instance, a security system based on English text passwords are susceptible to a dictionary attack. Thus, in order to ensure the utmost security, it is essential that the security system implements a method for generating a random number that appears completely random. In this manner, a completely random password or cryptographic key presents no opening or prior knowledge that can be exploited by an hostile agent.

Many prior art methods exist for generating random numbers. These prior art methods typically involve the use of some type of chaotic system. A chaotic system is one with a state that changes over time in a largely unpredictable manner. To use the chaotic system to generate a random number, there is some means of converting the state of the system into a sequence of bits (i.e., a binary number). In the past, chaotic systems were based on various sources, such as the sound of radio static, the output of a noisy diode, output of a Geiger counter, or even the motion of clouds. These chaotic systems can be converted to produce binary numbers by using standard techniques. For instance, a pseudo-random binary string can be generated from the digital recording of static noise via a digital microphone. Alternatively, a noisy diode can be sampled at a suitable frequency and converted into a digital signal, or a picture of an area of the sky can be taken and subsequently scanned and digitized. These resulting binary strings that are generated over time are generally random in nature.

However, there are several problems associated with simply using a chaotic system as a source of random numbers. First, chaotic systems can be completely or partially predicted over small amounts of time. For example, the position of clouds in some area of the sky at some time can be used to achieve reasonably accurate predictions of the position of clouds in the same area a short time into the future. Furthermore, the behavior of chaotic systems can be far from completely random. For instance, a digitized picture of a cloud formation will not look like a picture of random information, but instead, will look like a cloud formation. Moreover, chaotic systems may be biased by outside sources which may be predictable. As an example, a radio signal can be affected by a strong external signal, or the behavior of a noisy diode can be changed by the surrounding temperature.

All of the above problems arise because the behavior of a chaotic system may not be completely random. More specifically, an adversary observing or wishing to affect the random number source can take advantage of certain localities that may be inherent in chaotic systems. These localities can occur either in space or time. Referring back to the cloud example, knowing some of the picture can help one predict the rest of the picture, and knowing the state of the clouds at some time allows the hostile agent to reasonably guess the future state of the clouds. These flaws in chaotic systems make them potentially harmful choices for use in random number generators for cryptographic security systems in generating passwords. This is because an hostile agent can make use of the local properties of the random number generator by simply observing or affecting the system, to determine the generated passwords. Likewise, an hostile agent can take advantage of the local properties to substantially reduce the number of possibilities, thereby allowing the possibilities to be exhaustively tested much more quickly and effectively.

A further disadvantage of using a chaotic system as a source of randomness is that transforming the state of the system into a random number is a much slower process than typical computation done on a computer. Repeatedly generating random numbers from such a system can become a time bottleneck. The time bottleneck can be avoided in most computer applications by using pseudo-random numbers instead of random numbers. A pseudo-random number generator deterministically generates a sequence of numbers by some computational process from an initial number, called a seed. The goal of the computational process is to generate a sequence of numbers from the seed that appear to be random. In other words, an outside observer cannot predict the next number to be generated from the list of numbers previously generated without expending a great deal of computational effort. Thus, to generate a long sequence of pseudo-random numbers, one need only generate a much shorter random number to use as the seed for the pseudo-random number generator. Pseudo-random number generators are discussed in more detail in several standard texts, such as D. Knuth's *The Art of Computer Programming.* as well as the following articles: U. V. Vazirani and V. V. Vazirani, "Efficient and Secure Pseudo-Random Number Generation," *Advances in Cryptology-Proceedings of CRYPTO '84*, Berlin: Springer-Verlag, 1985, pp. 193–202 and L. Blum, M. Blum, and M. Shub, "A Simple Unpredictable Pseudo-Random Number Generator," *SIAM Journal on Computing*, v. 15, n. 2, 1986, pp. 364–383.

3

Therefore, there is a need in the prior art for an apparatus and method that is capable of generating random and pseudo-random numbers.

SUMMARY OF THE INVENTION

The present invention pertains to a method for generating a pseudo-random number that can be used in the formulation of a cryptographic key to ensure the security of confidential information. Initially, the state of a chaotic system is digitized to form a binary string. This can be done, for example, by taking pictures of a moving freeway, clouds, or lava lamps. The binary string is then cryptographically hashed to produce a second binary string. The cryptographic hashing function serves several purposes. The cryptographic hash make it difficult to predict the chaotic system. Furthermore, small variations in the digitized chaotic system will produce extremely different binary strings. In addition, knowledge about the cryptographic hash yields no information regarding the chaotic system. It is this second binary string which is used as a seed for a pseudo-random number generator. The resulting output from the pseudo-random number generator can then be used in forming a password for use in a security system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for generating a seed for use in a random number generator based upon the cryptographic hash of the digitization of a chaotic system is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

The present invention overcomes prior art problems in using a chaotic source by first applying a cryptographic hash function to a digitized chaotic system and then using the result as a seed to a conventional random number generator. A cryptographically secure pseudo-random number generator is used to provide an additional layer of security. The present invention can be used in any security application that uses random numbers to generate or verify passwords, cryptographic keys or other means of identification for a set of users. The present invention may also function independently as a method of generating random numbers without being part of a cryptographic application. Furthermore, the present invention can be implemented with several types of underlying hardware. Herein, the currently preferred embodiment is described with the understanding that alternative implementations based on or in conjunction with other chaotic sources or computational hardware may be suitable as well.

Figure 1:
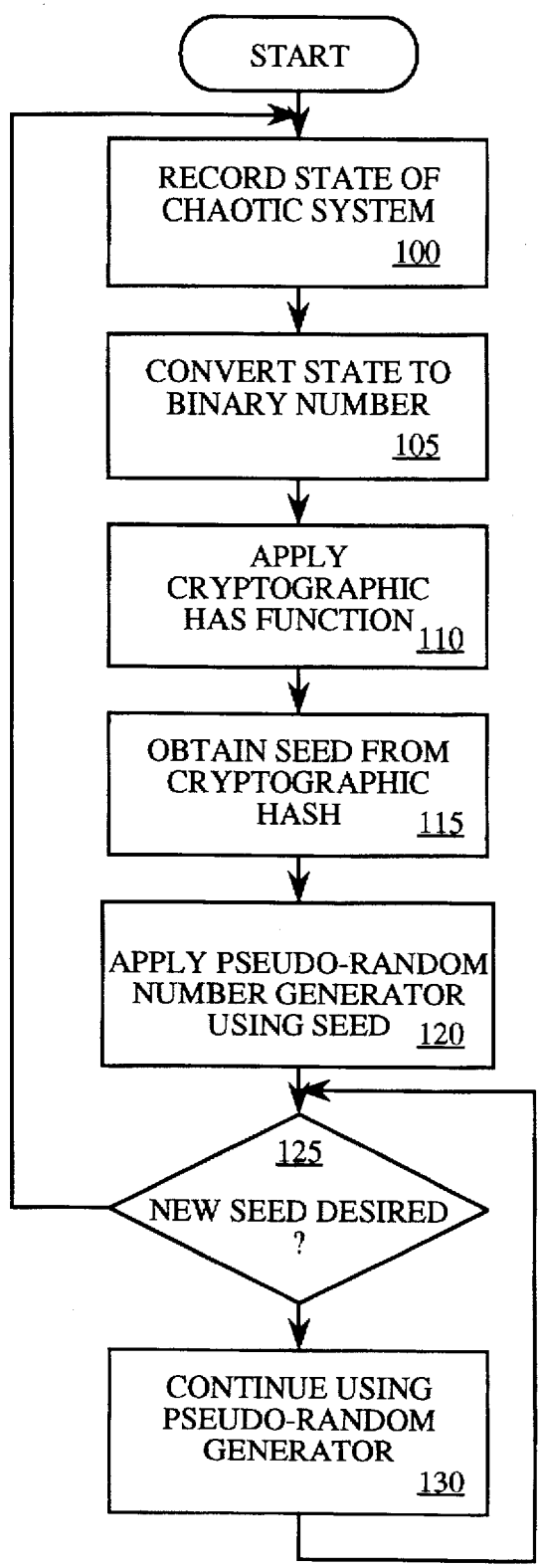
FIG. 1 is a flowchart describing the steps in creating a sequence of random numbers.

FIG. 1 is a flowchart describing the steps in creating a sequence of random numbers. An overall description of these steps is given in this paragraph. A more detailed description of these steps will be elaborated on in the rest of the description of the invention with reference to the currently preferred implementation. In the first step 100, the state of a chaotic system is recorded. The state is then converted into a sequence of bits to form a binary string, step 105. This sequence of bits is then modified using a cryptographic hash function, step 110. And from this modified sequence of bits one obtains yet another sequence of bits, which is designated as the "seed," step 115. This seed is then used as the initial state for a pseudo-random number generator, step 120. The pseudo-random number generator continues to produce numbers as desired, step 125. A new seed can be generated at any time by repeating the process by repeating step 120. It should be noted that, as an option, the pseudo-random number generator could be removed from the system. In which case, a new seed would be generated from the chaotic source each time a new random number is needed.

Figure 2:
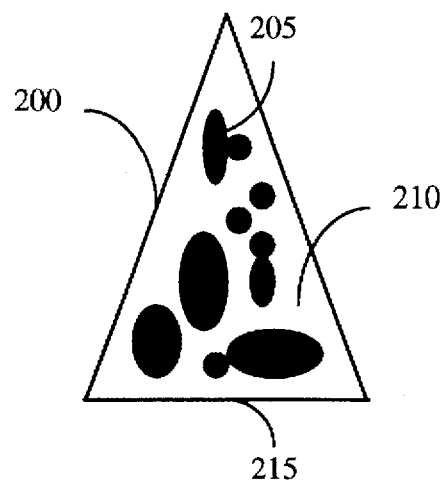
FIG. 2 illustrates the chaotic source used in the currently preferred embodiment of the present invention.
Figure 2:
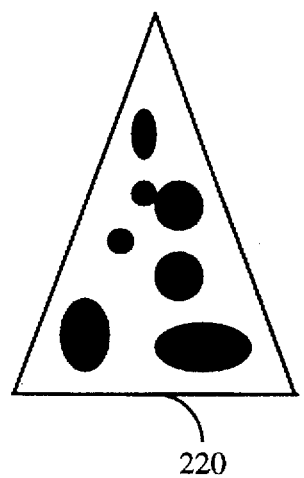

FIG. 2 illustrates the chaotic source used in the currently preferred embodiment of the present invention. The preferred embodiment uses lava lamps 200 as a source for a chaotic system. Lava lamps are chaotic systems in which two different types of fluids with different colors and chemical properties 205 and 210 interact in a closed container 215 in a highly unpredictable manner. This leads to a color pattern that changes over time 200 and 220. The rate at which the state of the lava lamp changes can be affected by changing, for example, the temperature inside the container 215. Other types of chaotic systems can be used in place of the lava lamps (e.g., digitized pictures of an ocean shoreline).

Figure 3:
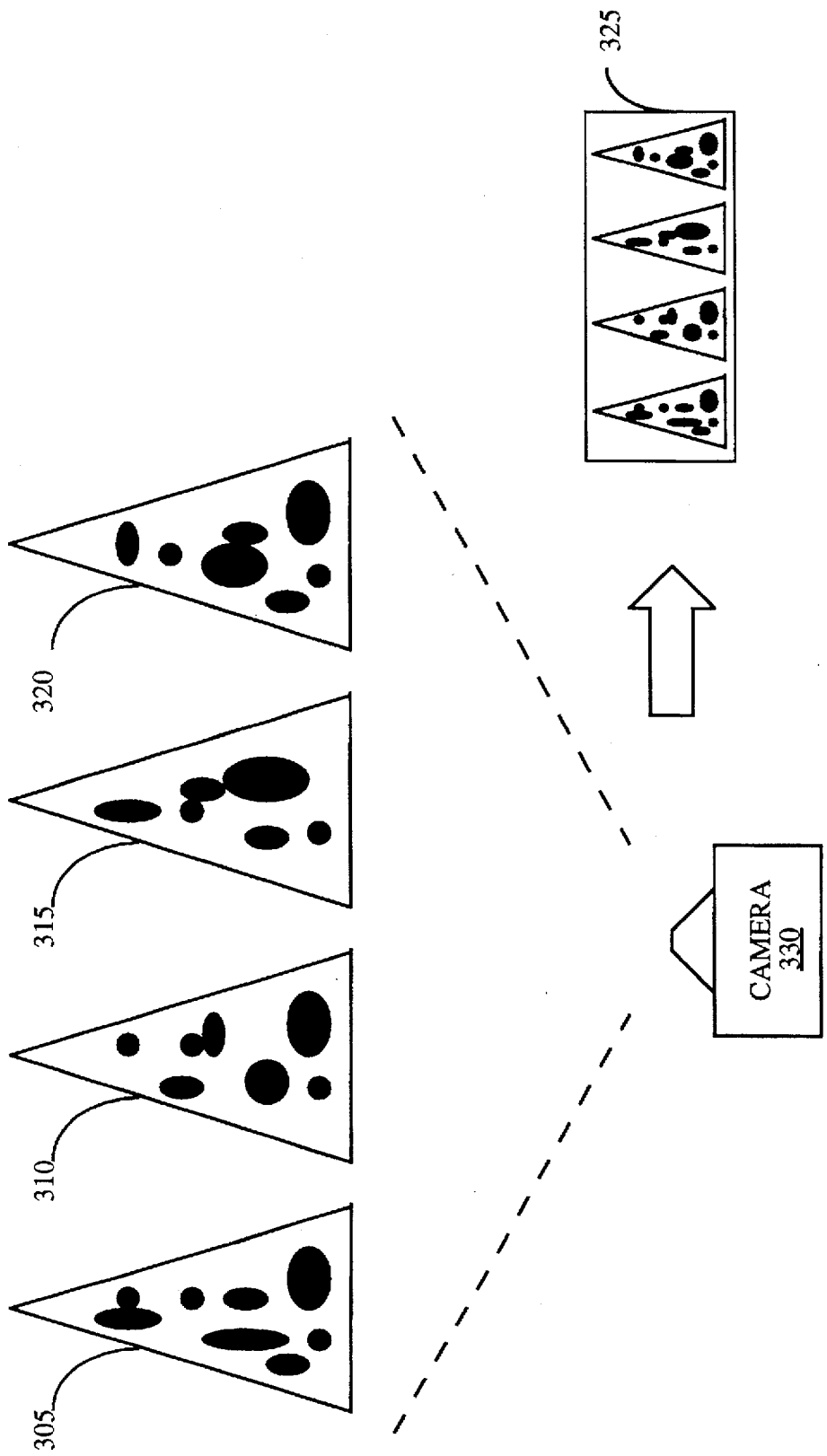
FIG. 3 demonstrates how lava lamps are used in the current implementation.

FIG. 3 demonstrates how lava lamps are used in the current implementation. Four lava lamps 305, 310, 315, and 320 are used, and their image is converted into a digital form 325 with a digital camera 330. Multiple lava lamps are useful for several reasons. In case one (or more) of the lamps breaks down, the system can still function, and by varying the rate of change of different lamps, one increases the unpredictability of the system. However, it should be noted that only a single lava lamp is required for the system to be functional.

Figure 4:
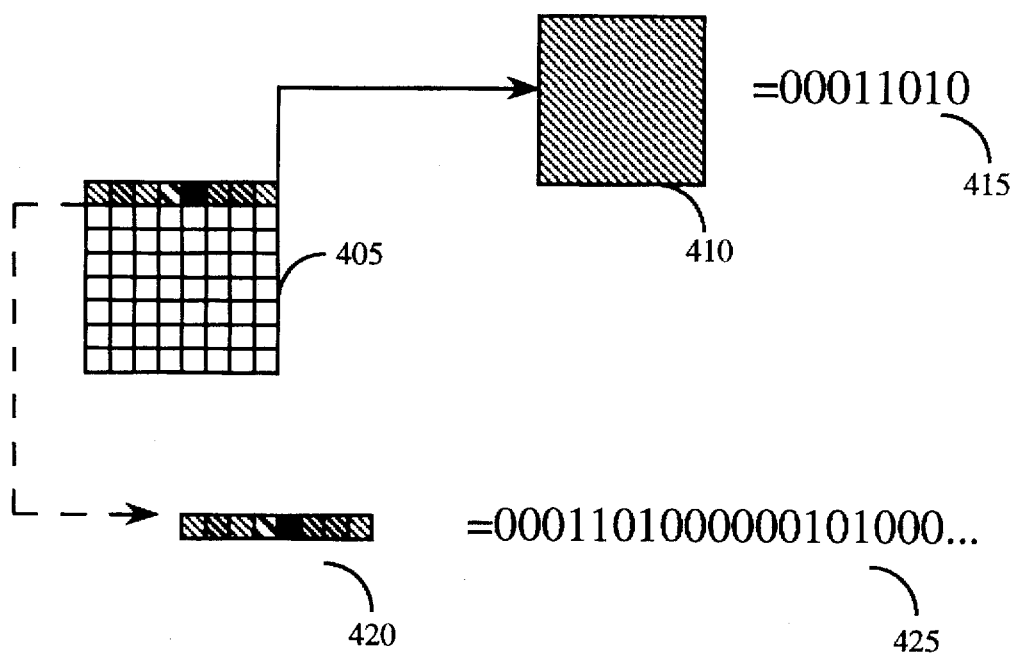
FIG. 4 shows a demonstration of how the chaotic source can be turned into a sequence of bits in the preferred implementation.

Referring to FIGS. 3 and 4, a demonstration is shown of how the chaotic source can be turned into a sequence of bits in the preferred implementation. A digital camera 330 is placed in front of the lava lamps 305,310,315, and 320. Note that the digital camera can either function continuously, such as a video camera, or it can record the image only at the time of a user command, such as a still-picture camera. The camera 330 records the picture as a digital image 325 that can be described as follows: the image is recorded as a rectangular array of values 405, with each value corresponding to the color at that point. The rectangular array is said to consist of pixels, and the value of a pixel, or the pixel value, is a binary representation of the associated color and intensity. For example, in FIG. 4, item 410 is a pixel and the corresponding binary string "00011010" 415 is the associated value represented as a binary number. It should be noted that the number of bits associated with a color may depend on the underlying computer system or the digital camera and does not affect the functioning of the present invention. The preferred implementation uses 24-bits per pixel. The rectangular array of pixels (only the first row is shown for convenience) 420 can be transformed into a single binary string "00011010000001010000 . . . " 425 by concatenating the binary pixel values and proceeding horizontally through the rows of the rectangular array. It should be noted that there are several standard methods for converting a chaotic source such as an image or a sound into a digital string. The current description of the preferred implementation could be modified to use any such method.

The binary string produced from the image is transformed using a cryptographic hash function. The importance of using a cryptographic hash function shall be described below. Examples of proposed cryptographic hash functions include the Secure Hash Standard and the Revised Secure Hash Standard proposed by the National Institute of Standards and Technology (NIST). The currently preferred implementation uses the dual mode NIST SHS-1. (See NIST PIPS PUB YY, "Secure Hash Standard," National Institute of Standards and Technology, U.S. Department of Commerce, DRAFT, 22 Jan. 1992). Alternatively, one can use an MD5 hash function. (See R. Rivest, "The MD5 Message Digest Algorithm," RFC 1321, April 1992.

Figure 5:
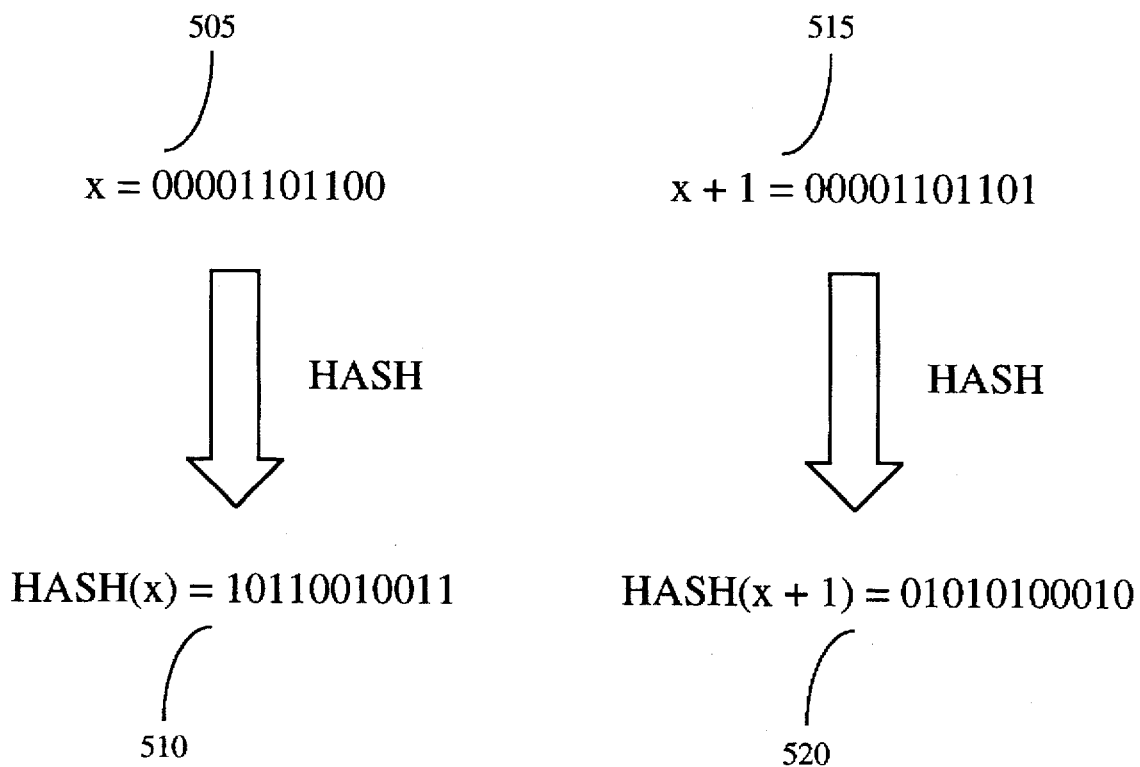
FIG. 5 demonstrates the application of a cryptographic hash function.

The function of a cryptographic hash function is demonstrated in FIG. 5. A cryptographic hash function takes a binary string, for instance, "x=00001101100" 505, and transforms it into another binary siring, for instance denoted by "hash(x)=10110010011" 510. Note that hash(x) need not have the same length as x. In addition, several strings may map to the same value after applying the cryptographic hash function. In other words, there may be strings x and y such that x does not equal y but hash(x)=hash(y). Cryptographic hash functions have the following properties:

1) Given hash(x), it is hard to find x.

2) Given hash(x), it is hard to find hash(x+1).

3) Given x and hash(x), it is hard to find some value y different from x, such that hash(x)=hash(y).

The first property guarantees that a hostile agent would find it extremely difficult to use the output of the invention to determine the state of the underlying chaotic system. The external user will only see hash(x), and hence it will be hard for the user to determine x, which corresponds to the state of the system.

The second property guarantees that a hostile agent will find it extremely difficult to predict future output of the invention from the current output, even when there is locality in the system. The second property can be interpreted as saying that similar inputs to the hash function produce wildly disparate outputs, hence destroying any apparent locality inherent in the chaotic system. For example, in FIG. 5, it can be seen that two similar inputs "x=00001101100" 505 and "x+1=00001101101" 515, after being hashed, yield apparently unrelated outputs "hash(x)= 10110010011" 510 and "hash(x+1)=01010100010" 520.

The third property guarantees that an external adversary will find it extremely difficult to find an alternative value y such that hash(x)=hash(y). In many systems, the state x might be used as a password or cryptographic key that the system checks by determining if it has the right hash value.

This property guarantees that it is difficult for a hostile agent to find an alternative password or cryptographic key.

Together, these three properties solve the problems with chaotic systems described earlier by not allowing the hostile agent information about the underlying chaotic system and by removing the locality that may be inherent in the chaotic system.

The currently preferred implementation uses the NIST SHS-1 to produce 100 bytes (800 bits) of hash from the image. The required number of bytes are used as a seed for a pseudo-random number generator. It should be noted that the pseudo-random number generator enhances the invention both by promoting speed and also by reducing the reliance on the underlying chaotic system. The currently preferred implementation uses a pseudo-random number generator developed by Blum, Blum, and Shub, although any similar generator could be used. (See L. Blum, M. Blum, and M. Shub, "A Simple Unpredictable Pseudo-Random Number Generator," *SIAM Journal on Computing*, v. 15, n. 2, 1986, p. 364–383).

Figure 6:
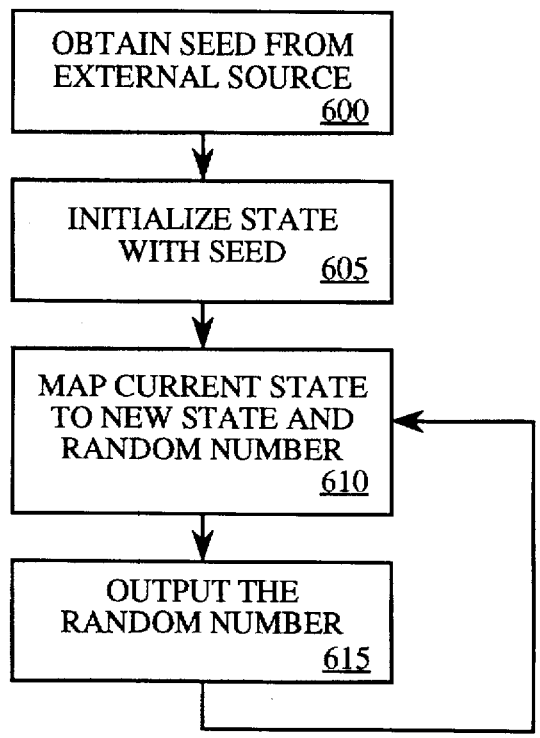
FIG. 6 shows the function of the pseudo-random number generator.

The function of the pseudo-random number generator in regard to the current invention is described in FIG. 6. Initially, the pseudo-random number generator receives a seed, step 600. For the currently preferred embodiment, the seed is obtained by applying a cryptographic hash function to the output from the chaotic source and taking the appropriate number of bytes. The seed is then used as the initial state, step 605. In step 610, the pseudo-random number generator repeatedly takes this state and applies a deterministic transformation to obtain a new state and a random number. This process is repeated as desired, steps 610 and 615. As the pattern generated will eventually cycle, one may wish to periodically refresh the system by obtaining a new seed. The time period between refreshes of the seed may be determined by the cryptographic application.

Figure 7:
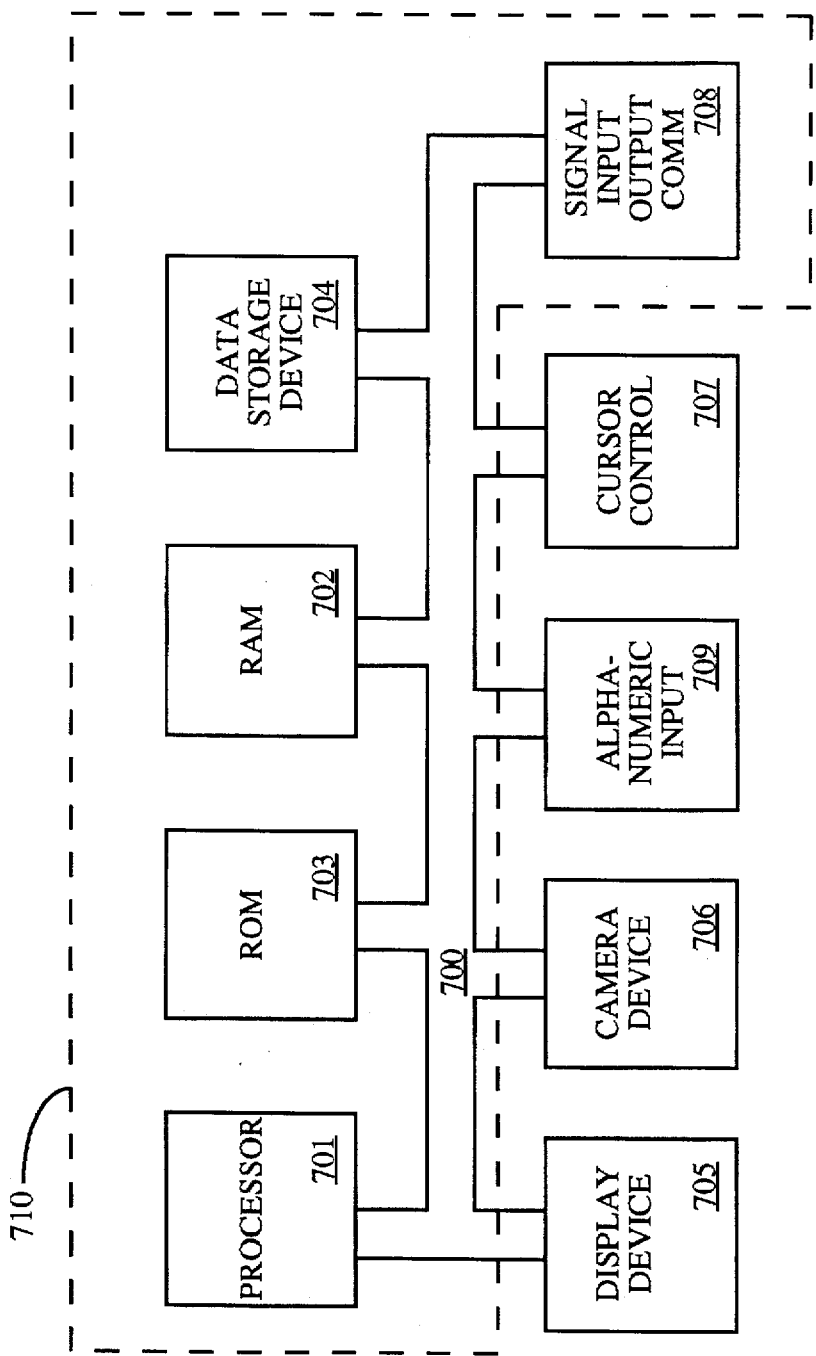
FIG. 7 illustrates an exemplary computer system upon which the present invention may be practiced.

FIG. 7 illustrates an exemplary computer system 710 upon which the present invention may be practiced. It is appreciated that the computer system 710 of FIG. 7 is exemplary only and that the present invention can operate within a number of different computer systems including general purpose computers systems, embedded computer systems, and computer systems that are part of a computer network. Computer system 710 of FIG. 7 includes an address/data bus 700 for communicating information, a central processor 701 unit coupled with the bus 700 for processing information and instructions, a random access memory 702 coupled with the bus 900 for storing information and instructions for the central processor 701, a read only memory 703 coupled with the bus 700 for storing static information and instructions for the processor 701. Furthermore, a data storage device 704 (e.g., a magnetic or optical disk and disk drive) may also be coupled to the bus 700 for storing information and instructions. A signal I/O device 708 is coupled to the bus 700 for communicating command selections to the processor 701. Externally, a display device 705 may be coupled to the bus 700 for displaying information (e.g., graphics primitives) to a computer user. An alphanumeric input device 706 including alphanumeric and function keys is coupled to the bus 700 for communicating information and command selections to the central processor 701. A cursor control device 707 is coupled to the bus for communicating user input information and command selections to the central processor 701. Externally a camera device 709 is coupled to the bus 700 for digitizing external images.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for ensuring the security of a system from unauthorized access, comprising the steps of:

digitizing a state of a chaotic system to form a set of binary bits;

applying a hash function to the set of binary bits;

obtaining a seed number from the hash function performed on the binary bits;

inputting the seed number into a random number generator;

using an output from the random number generator to form a password or cryptographic key, wherein the password or cryptographic key is used appropriately by the security system.

2. The method of claim 1, wherein the hash function is comprised of a cryptographic hash function.

3. The method of claim 1, wherein the chaotic system is comprised of recording at least one lava lamp.

4. The method of claim 1 further comprising the step of generating a second password or cryptographic key by inputting the seed number a second time into the random number generator.

5. The method of claim 1, wherein the hash function is comprised of a NIST SHS-1 hash.

6. The method of claim 1, wherein the random number generator is comprised of a Blum, Blum, Shub pseudo-random number generator.

7. The method of claim 1, wherein the chaotic system is comprised of one or more chaotic sources.

8. The method of claim 7, wherein the chaotic system is comprised of one or more deterministic systems.

9. An apparatus for generating passwords or cryptographic keys used in providing security for confidential information, comprising:

a digitizer for generating a binary string based upon a chaotic source;

a processor coupled to the digitizer for performing a hash function on the binary string to produce a seed;

a generator coupled to the processor for accepting the seed and generating a random number according to the seed, wherein the random number is used in producing the password or cryptographic key.

10. The apparatus of claim 9, wherein the hash function is comprised of a cryptographic NIST SHS-1 hash.

11. The apparatus of claim 9, wherein the chaotic system is comprised of at least one lava lamp.

12. The apparatus of claim 9, wherein the generator generates a second password or cryptographic key by inputting the seed a second time into the generator.

13. The apparatus of claim 9, wherein the generator is comprised of a Blum, Blum, Shub pseudo-random number generator.

14. A computer-readable memory encoded with data representing a computer program that can cause a computer to generate a pseudo-random number, comprising:

a first binary string corresponding to the digitization of a chaotic source;

a hash function for generating a second binary string by performing a hash on the first binary string;

a pseudo-random number generator for accepting the second binary string as a seed and generating the pseudo-random number.

15. The computer-readable memory of claim 14, wherein the hash function is comprised of a cryptographic NIST SHS-1 hash.

16. The computer-readable memory of claim 14, wherein the chaotic system is comprised of at least one lava lamp.

17. The computer-readable memory of claim 14, wherein the pseudo-random number generator generates a second pseudo-random number by inputting the second binary string a second time into the generator.

18. The computer-readable memory of claim 14, wherein the pseudo-random number generator is comprised of a Blum, Blum, Shub pseudo-random number generator.

* * * * *